(12) United States Patent
Wong et al.

(10) Patent No.: US 12,547,547 B2
(45) Date of Patent: Feb. 10, 2026

(54) MULTI-ADDRESS SPACE COLLECTIVES ENGINE

(71) Applicant: ATI Technologies ULC, Markham (CA)

(72) Inventors: Benjamin Wong, Markham (CA); Philip Ng, Markham (CA)

(73) Assignee: ATI Technologies ULC, Markham (CA)

( * ) Notice: Subject to any disclaimer, the term of this patent is extended or adjusted under 35 U.S.C. 154(b) by 78 days.

(21) Appl. No.: 18/478,911

(22) Filed: Sep. 29, 2023

(65) Prior Publication Data

US 2024/0202132 A1  Jun. 20, 2024

Related U.S. Application Data

(60) Provisional application No. 63/432,651, filed on Dec. 14, 2022.

(51) Int. Cl.
*G06F 3/06* (2006.01)
*G06F 12/10* (2016.01)

(52) U.S. Cl.
CPC .................................. *G06F 12/10* (2013.01)

(58) Field of Classification Search
CPC ............................. G06F 12/10; G06F 12/1072
See application file for complete search history.

(56) References Cited

U.S. PATENT DOCUMENTS

| | | | | |
|---|---|---|---|---|
| 5,230,045 | A * | 7/1993 | Sindhu | G06F 12/1036 711/E12.065 |
| 2002/0145609 | A1* | 10/2002 | Emmot | G09G 5/393 345/558 |
| 2005/0097300 | A1* | 5/2005 | Gildea | G06F 9/5066 712/11 |
| 2024/0070071 | A1* | 2/2024 | Swaine | G06F 12/0811 |

\* cited by examiner

*Primary Examiner* — Yong J Choe
(74) *Attorney, Agent, or Firm* — Greenberg Traurig, LLP

(57) ABSTRACT

The disclosed device includes a collectives engine that can offload collectives communications of multiple nodes and perform collective operations. The collectives engine can manage a direct mapping scheme of local memories of the nodes for access by the collectives engine. Various other methods, systems, and computer-readable media are also disclosed.

20 Claims, 7 Drawing Sheets

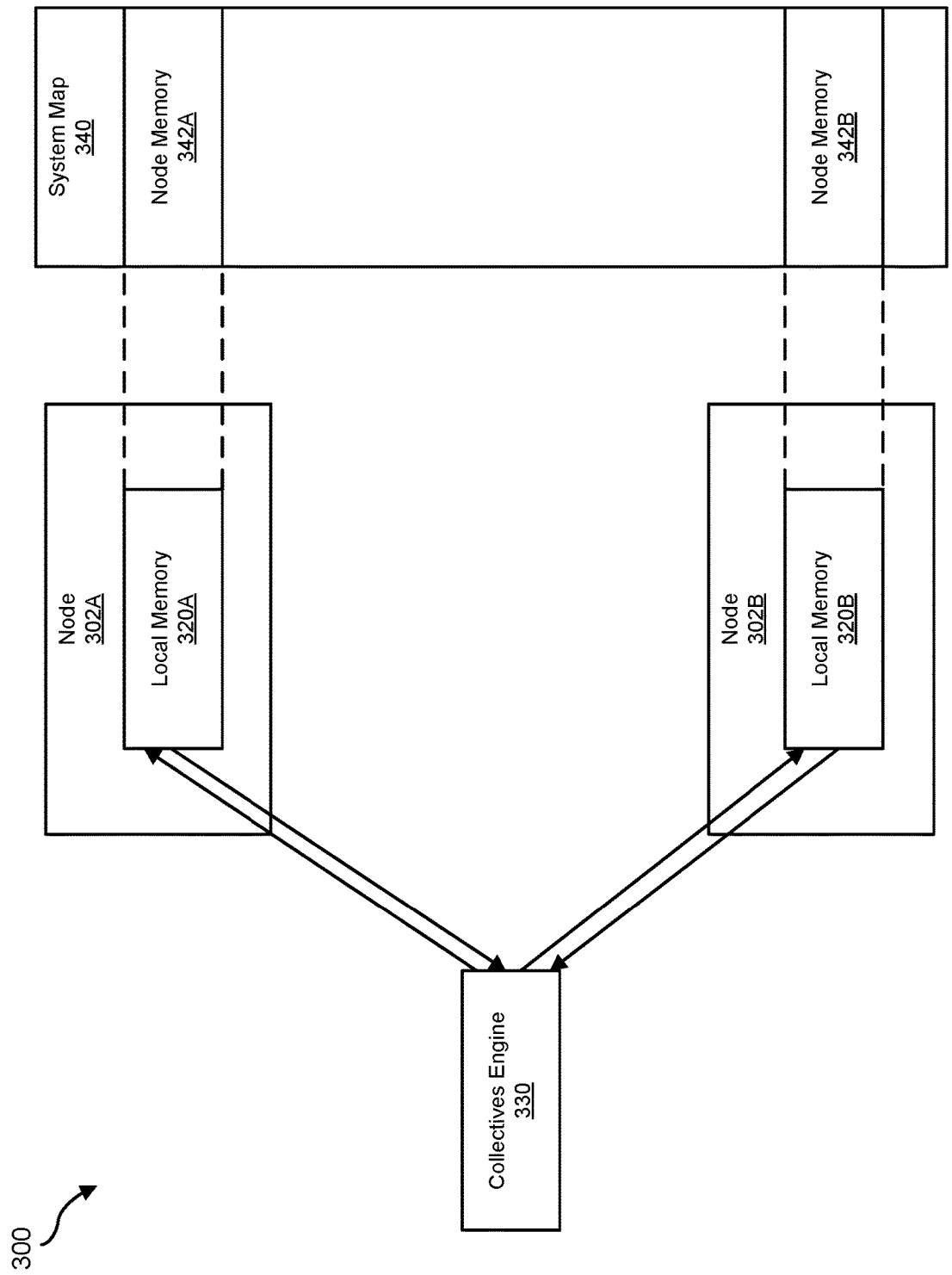

MULTI-ADDRESS SPACE COLLECTIVES ENGINE

CROSS REFERENCE TO RELATED APPLICATION

This application claims the benefit of U.S. Provisional Application No. 63/432,651, filed 14 Dec. 2022, the disclosure of which is incorporated, in its entirety, by this reference.

BACKGROUND

Various improvements to computing performance, such as increasing a number of processing cores, provide increased performance but can reach scalability limits. Collectives communications allow for global communications operations amongst all processes/nodes in a system, including networked nodes. Collective communication operations may be used, for example, to exchange data between multiple nodes, or to perform mathematical reductions such as a sum or product on data generated by multiple nodes. As a number of nodes increase, collectives communications can suffer from scalability issues. To ensure better scalability, certain communications processing can be offloaded from the nodes (e.g., processors thereof) to a collectives engine that can reside in, for example, a network adapter or switch.

BRIEF DESCRIPTION OF THE DRAWINGS

The accompanying drawings illustrate a number of exemplary implementations and are a part of the specification. Together with the following description, these drawings demonstrate and explain various principles of the present disclosure.

FIG. 3 is a diagram of a multi-address space collectives engine.

Figure 1:
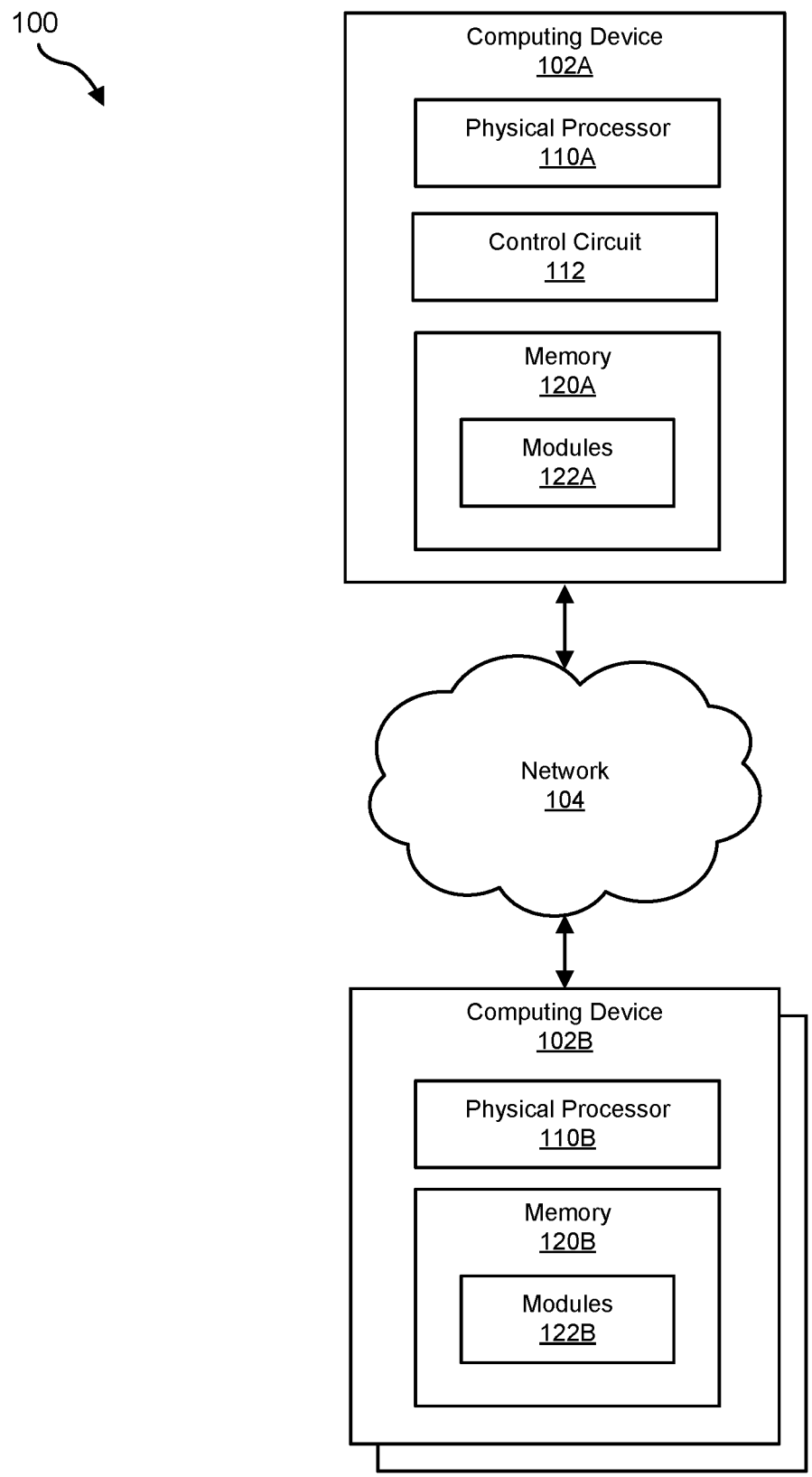
FIG. 1 is a block diagram of an exemplary system for a multi-address space collectives engine.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to a multi-address space collectives engine. As will be explained in greater detail below, implementations of the present disclosure provide a collectives engine that offload collectives communications of a plurality of nodes and can further manage a direct mapping scheme of local memories of the nodes. By allowing the collectives engine to access the local memories more directly, rather than through one or more additional virtual mappings, the overhead for memory management is reduced (e.g., by reducing management of virtual memory mapping and/or avoiding extra data movement between local and shared memory regions), allowing more efficient collectives communications and operations. The systems and methods provided herein improve the functioning of a computer itself via improved memory management, further reducing network bandwidth associated with managing local memory as well as collectives communications/operations, and further improves the technical field of collective computing.

In one implementation, a device for a multi-address space collective engine includes a control circuit programmed to offload collectives communications of a plurality of nodes, and configured to manage a direct mapping scheme of local memories of the plurality of nodes for access by the control circuit.

In some examples, the control circuit receives a pre-translated physical address for accessing at least one of the local memories of the plurality of nodes. In some examples, the device includes a memory management unit (MMU) for translating physical addresses of the local memories of the plurality of nodes using the direct mapping scheme. In some examples, the control circuit receives the pre-translated physical address as part of a collective operation.

In some examples, the direct mapping scheme includes an address space identifier. In some examples, the control circuit receives a virtual address and an address space identifier corresponding to at least one of the local memories of the plurality of nodes. In some examples, the device includes a memory management unit (MMU) configured to translate, in-line with an access request by the control circuit, the virtual address and the address space identifier into a physical address of the at least one of the local memories of the plurality of nodes. In some examples, the control circuit receives the virtual address and the address space identifier as part of a collective operation.

In some examples, at least one of the plurality of nodes corresponds to an application. In some examples, at least one of the plurality of nodes corresponds to a network device.

In one implementation, a system for a multi-address space collective engine includes a plurality of nodes having local memories, a control circuit programmed to offload collectives communications of the plurality of nodes, and configured to manage a direct mapping scheme of the local memories of the plurality of nodes for access by the control circuit as part of a collective operation, wherein the direct mapping scheme uses a virtual address with an address space identifier.

In some examples, the control circuit receives, as part of the collective operation, a pre-translated physical address for accessing at least one of the local memories of the plurality of nodes. In some examples, the system includes a memory management unit (MMU) for translating physical addresses of the local memories of the plurality of nodes using the direct mapping scheme.

In some examples, the control circuit receives, as part of the collective operation, a virtual address and an address space identifier corresponding to at least one of the local memories of the plurality of nodes. In some examples, the control circuit translates, using a memory management unit (MMU) in-line with an access requires by the control circuit, the virtual address and the address space identifier into a physical address of the at least one of the local memories of the plurality of nodes.

In some examples, at least one of the plurality of nodes corresponds to an application. In some examples, at least one of the plurality of nodes corresponds to a network device.

In one implementation, a method for a multi-address space collective engine includes (i) selecting, by selecting a virtual address and an address space identifier according to a direct mapping scheme, a local memory of at least one of a plurality of nodes to be accessed as part of a collective operation by a control circuit programmed to offload collectives communications of the plurality of nodes, (ii) translating the virtual address and the address space identifier into a physical address corresponding to the selected local memory, and (iii) accessing, by the control circuit using the physical address, the selected local memory.

In some examples, the method includes receiving, by the control circuit, the physical address. In some examples, the method includes receiving, by the control circuit, the virtual address and the address space identifier, wherein translating the virtual address and the address space identifier into the physical address further comprises translating, by the collectives engine using a memory management unit (MMU), the virtual address and the address space identifier into the physical address.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIGS. 1-6, detailed descriptions of a multi-address space collective engine. Detailed descriptions of example systems for collective engines with multiple address spaces will be provided in connection with FIGS. 1, 2A, 2B, 3, 4, and 5. Detailed descriptions of corresponding computer-implemented methods will also be provided in connection with FIG. 6.

FIG. 1 illustrates an exemplary network environment 100 implementing aspects of the present disclosure. The network environment 100 includes computing device 102A, a network 104, and computing device 102B. Computing device 102A and/or computing device 102B can each be a network device, such as a network switch, router, etc., and/or a client device or user device, such as a desktop computer, laptop computer, tablet device, smartphone, or other computing device such as a server. Computing device 102A includes a physical processor 110A and computing device 102B includes a physical processor 110B. Physical processor 110A and/or physical processor 110B can correspond to one or more instances of any type or form of hardware-implemented processing unit capable of interpreting and/or executing computer-readable instructions including, without limitation, chiplets (e.g., smaller and in some examples more specialized processing units that can coordinate as a single chip), microprocessors, microcontrollers, Central Processing Units (CPUs), graphics processing units (GPUs), Field-Programmable Gate Arrays (FPGAs) that implement soft-core processors, Application-Specific Integrated Circuits (ASICs), systems on chip (SoCs), co-processors such as digital signal processors (DSPs), Neural Network Engines (NNEs), accelerators, graphics processing units (GPUs), portions of one or more of the same, variations or combinations of one or more of the same, and/or any other suitable physical processor. In some implementations, a physical processor referred to herein (e.g., physical processor 110A and/or physical processor 110B) can correspond to a host processor along with a co-processor, which is some examples can be separate processors.

In some examples, processor 110A and/or processor 110B accesses and/or modifies data and/or instructions stored in memory 120A and/or memory 120B. Memory 120A and/or memory 120B each correspond to instance of any type or form of volatile or non-volatile storage device or medium capable of storing data and/or computer-readable instructions, including, without limitation, Random Access Memory (RAM), Read Only Memory (ROM), flash memory, Hard Disk Drives (HDDs), Solid-State Drives (SSDs), optical disk drives, caches, variations, or combinations of one or more of the same, and/or any other suitable storage memory.

In certain implementations, memory 120A can store one or more modules 122A and memory 120B can store one or more modules 122B. Modules 122A and/or modules 122B can represent one or more software applications or programs that, when executed by a computing device, causes the computing device to perform one or more tasks. For example, and as will be described in greater detail below, one or more of modules 122A and/or modules 122B can represent modules stored and configured to run on one or more computing devices, such as the devices illustrated in FIG. 1 (e.g., computing device 102A and/or computing device 102B). In some implementations, a module can be implemented as a circuit. One or more of modules 122A and/or 122B can also represent all or portions of one or more special-purpose computers configured to perform one or more tasks.

Computing device 102A is communicatively coupled to computing device 102B through network 104. Network 104 represents any type or form of communication network, such as the Internet, and can comprise one or more physical connections, such as LAN, and/or wireless connections, such as WAN.

As further illustrated in FIG. 1, computing device 102A includes a control circuit 112. In some implementations, control circuit 112 corresponds to and/or is an implementation of a collectives engine for offloading collectives communications (e.g., collective operations) from nodes (e.g., locally from one or more physical processor 110A and/or modules 122A, and/or remotely from one or more computing device 102B as well as one or more physical processor 110B and/or modules 122B) in a collective system corresponding to network environment 100. Although FIG. 1 illustrates computing device 102A and computing device 102B, in other examples, network environment 100 can include additional computing devices which computing device 102A can manage in collective operations.

Control circuit 112 can correspond to circuitry and/or instructions for managing collectives communications/operations of nodes such as components of computing device 102A and/or computing device 102B and other instances thereof. In some examples, a node can correspond to an application (e.g., software that can use/process data involved in collectives operations as can be represented by modules 122A and/or modules 122B) and/or a device (e.g., a computing or networking device such as processors, network interfaces, switches, etc. that can locally perform portions of collectives operations by receiving, processing as needed, and forwarding data to appropriate nodes and/or a shared memory device or device containing addressable memory that in some examples is not able to process data on its own). In some implementations, control circuit 112 can further manage a direct mapping scheme of local memories (e.g., memory 120B) of nodes for access by the collectives engine, as will be described further below.

Figure 2A:
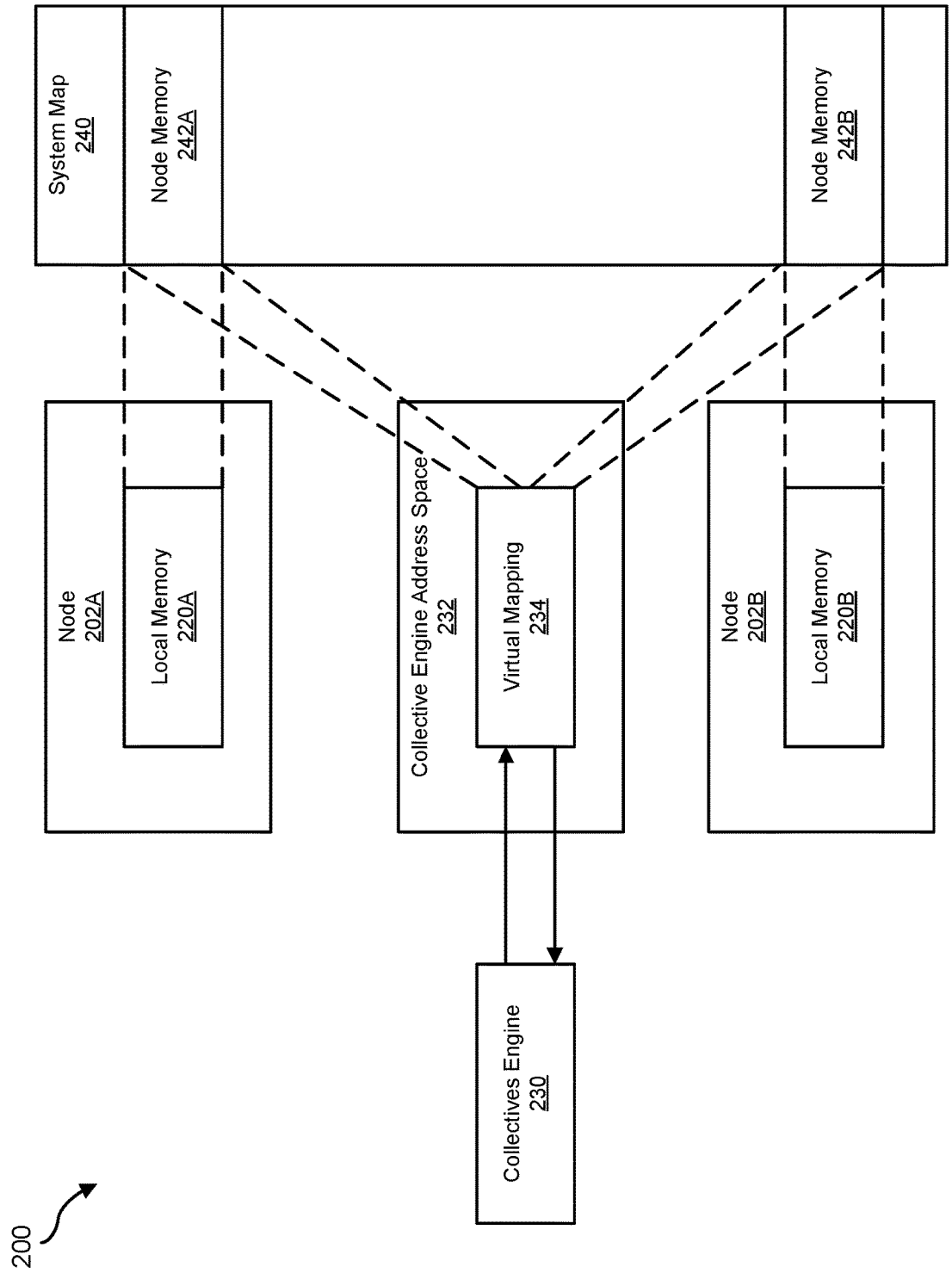
FIGS. 2A-B are diagrams of collectives engines.
Figure 2B:
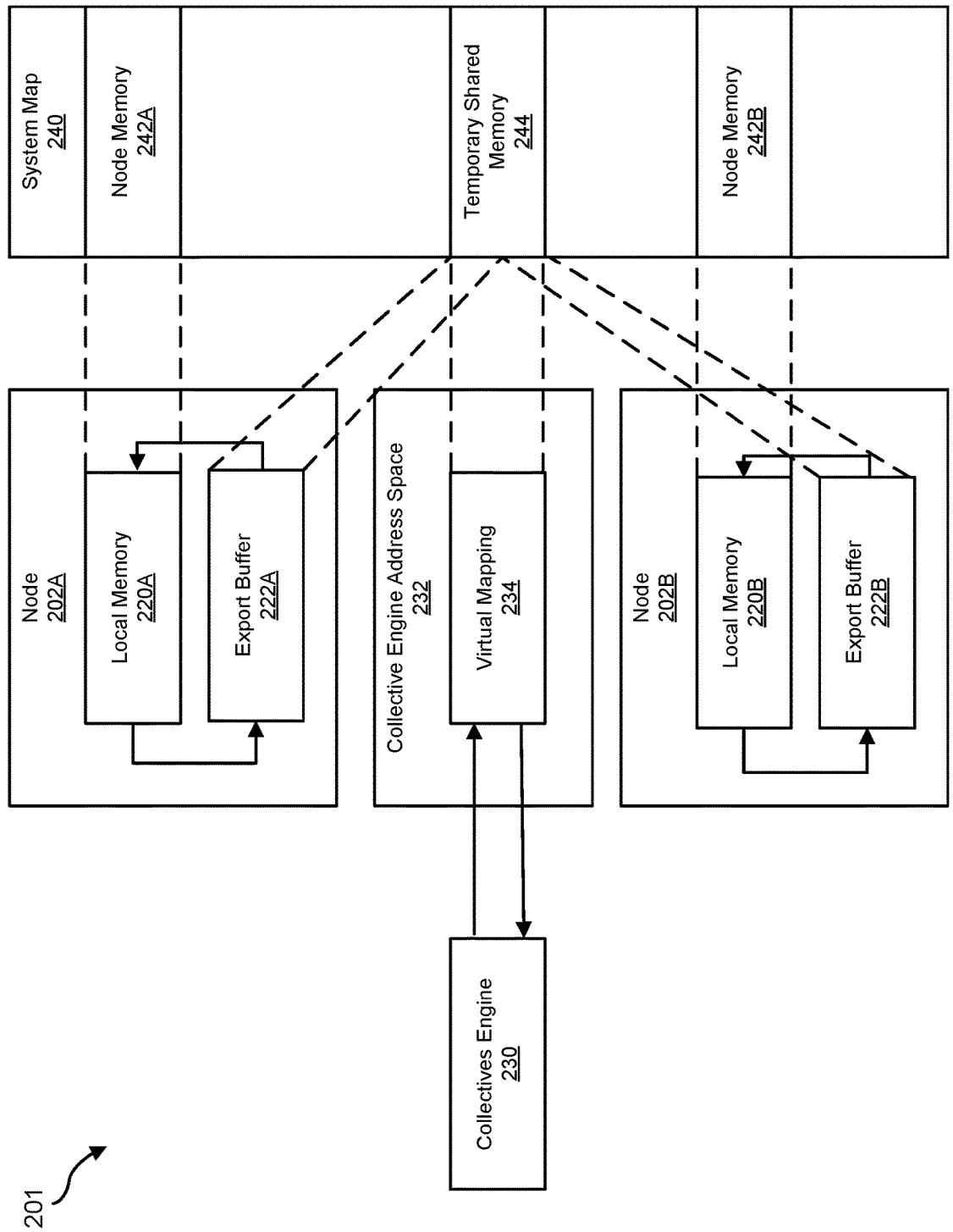

FIGS. 2A and 2B illustrate how a collectives engine can manage multiple address spaces (e.g., address spaces for each node). FIGS. 2A and 2B illustrate a collectives engine 230 corresponding to a collectives engine as described herein and further corresponding to control circuit 112, and a node 202A and a node 202B, each corresponding to nodes as described herein, which in some examples can be co-located in a same device or located on different devices and further can be co-located with collectives engine 230 and/or be remote to collectives engine 230. Each node can have its own local memory. Node 202A has a local memory 220A (corresponding to an instance of memory 120B) and node 202B has a local memory 220B (corresponding to another instance of memory 120B).

Collectives engine 230 can operate in its own address space, a collective engine address space 232. Certain collectives operations can require accessing (e.g., reading, computing, and/or writing) data from individual nodes such as node 202A and/or node 202B. For example, collectives engine 230 can receive a command (e.g., a collectives operation) to access local memory 220A and/or local memory 220B.

Collectives engine 230 normally cannot access the address spaces of node 202A and node 202B as their respective address spaces can conflict or otherwise be incompatible. Thus, in system 200 of FIG. 2A, a system map 240 provides, using virtual mapping 234, mapping of the local memories, such as local memory 220A to a node memory 242A, and local memory 220B to a node memory 242B such that collectives engine 230 can access the local memories.

However, managing virtual mapping 234 for system map 240 can require significant overhead. For instance, as the entire local memory is not mapped, any changes (e.g., increases and/or decreases in size needed, deleting the memory, accessing different portions of the local memory, etc.) requires virtual mapping 234 to be remapped in system map 240. As the number of applications/nodes grows, managing virtual mapping 234 can become complex and more difficult to scale. Moreover, an initial set up for virtual mapping 234 can also create latency.

In system 201 of FIG. 2B, the significant overhead for managing virtual mapping 234 can be reduced. In FIG. 2B, each of node 202A and node 202B include their own local memory (e.g., local memory 220A and local memory 220B, respectively) as well as a temporary export buffer (e.g., an export buffer 222A and an export buffer 222B, respectively). As illustrated in FIG. 2B, export buffer 222A and export buffer 222B are pre-mapped to a temporary shared memory region 244 of system map 240 for collective engine address space 232. Because temporary shared memory region 244 does not change (e.g., remains mapped to export buffer 222A and export buffer 222B which do not change size), maintaining virtual mapping 234 can be greatly simplified.

However, each of node 202A and node 202B must manage their own export buffer in order for collectives engine 230 to access the correct data. For example, node 202A must copy data from local memory 220A to export buffer 222A, wait for collectives engine 230 to access the data via temporary shared memory region 244, and then copy the updated data from export buffer 222A back to local memory 220A. Similarly, node 202B must refresh local memory 220B with modified data in export buffer 222B. Thus, each node/application has to manage their respective temporary export buffer, which can consume additional memory bandwidth, power, and time.

FIG. 3 illustrates a system 300 for a multi-address space collectives engine 330 (corresponding to a collectives engine described herein such as control circuit 112) that provides collectives communications offloading for a node 302A (corresponding to a node/application described herein) and a node 302B (corresponding to a node/application described herein). In some examples, node 302A and/or node 302B can be co-located in a same device or located on different devices and further can be co-located with collectives engine 330 and/or be remote to collectives engine 330. Node 302A includes a local memory 320A (corresponding to an instance of memory 120B) and node 302B includes a local memory 320B (corresponding to another instance of memory 120B). However, unlike system 200 or system 201, system 300 includes collectives engine 330 that can support multiple address spaces. As illustrated in FIG. 3, local memory 320A can be mapped to a node memory 342A of a system map 340 and local memory 320B can be mapped to a node memory 342B. Collectives engine 330 can access the respective local memories of node 302A and node 302B without an intermediary virtual mapping and without requiring each application to manage an additional buffer. In other words, a direct mapping scheme (e.g., with system map 340) allows collectives engine 330 to access the local memories.

In some implementations, each node/application can be associated with an identifier in the direct mapping scheme such that collectives engine 330 can distinguish between respective address spaces. A software API can include descriptors that include multiple source/destination addresses, each with an associated address space identifier that can be encoded as, for example, a single descriptor with a pointer to indirect configuration page, a chain of extended descriptors with address information embedded, etc. System map 340 can therefore correspond to physical address spaces for the local memories (e.g., including physical addresses that can get mapped, such as by a memory management unit, to the local memories). Thus, system 300 can avoid the overhead described with respect to system 200 and system 201.

Figure 4:
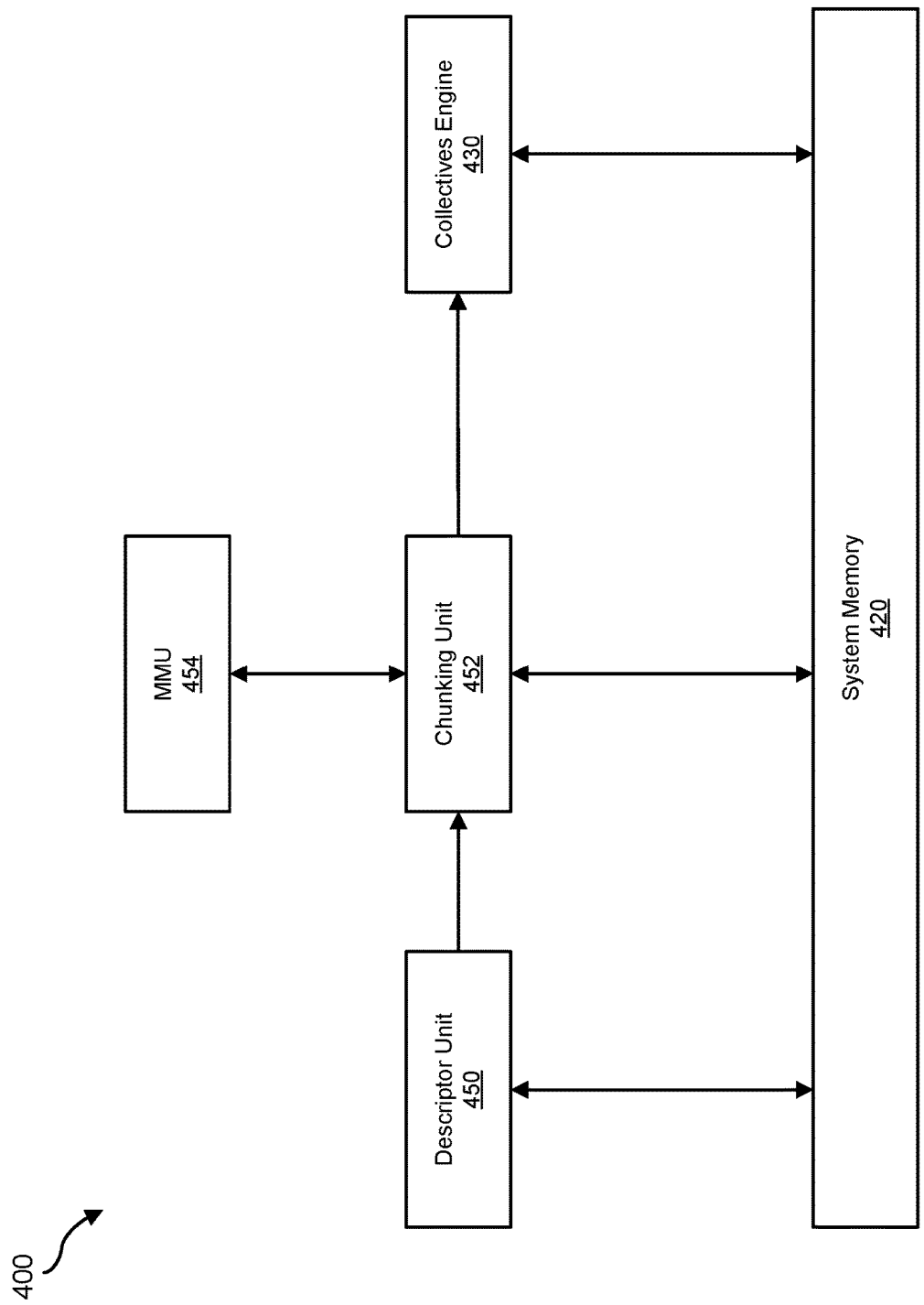
FIG. 4 is a diagram of an exemplary hardware architecture of a multi-address space collectives engine.

FIG. 4 illustrates an example architecture of a system 400 (corresponding to network environment 100 and/or a portion thereof) of a multi-address space collectives engine 430 (corresponding to control circuit 112). System 400 illustrates a hardware flow using pre-translated addresses. A descriptor unit 450 can fetch/parse a descriptor (e.g., as part of a collective operation) that references a virtual/logical address for a system memory 420 (which can correspond collectively to local memories of nodes managed by collectives engine 430). A chunking unit 452 can chunk (e.g., separate/organize into data portions) the data corresponding to the referenced address. In some examples, descriptor unit 450, chunking unit 452, and collectives engine 430 can be co-located on a same device. Chunking unit 452 can use a memory management unit (MMU) 454 to translate the address into a physical address and address space identifier for passing as a command to collectives engine 430. In some examples, MMU 454 can correspond to a relevant portion of system memory 420 being accessed, such that multiple MMUs 454 can manage respective portions of system memory 420. Moreover, in some examples MMU 454 can be remote from collectives engine 430. Collectives engine 430 can access (e.g., read and/or write) memory 420 to perform the command. Thus, collectives engine 430 receives a pre-translated physical address for accessing local memories.

Figure 5:
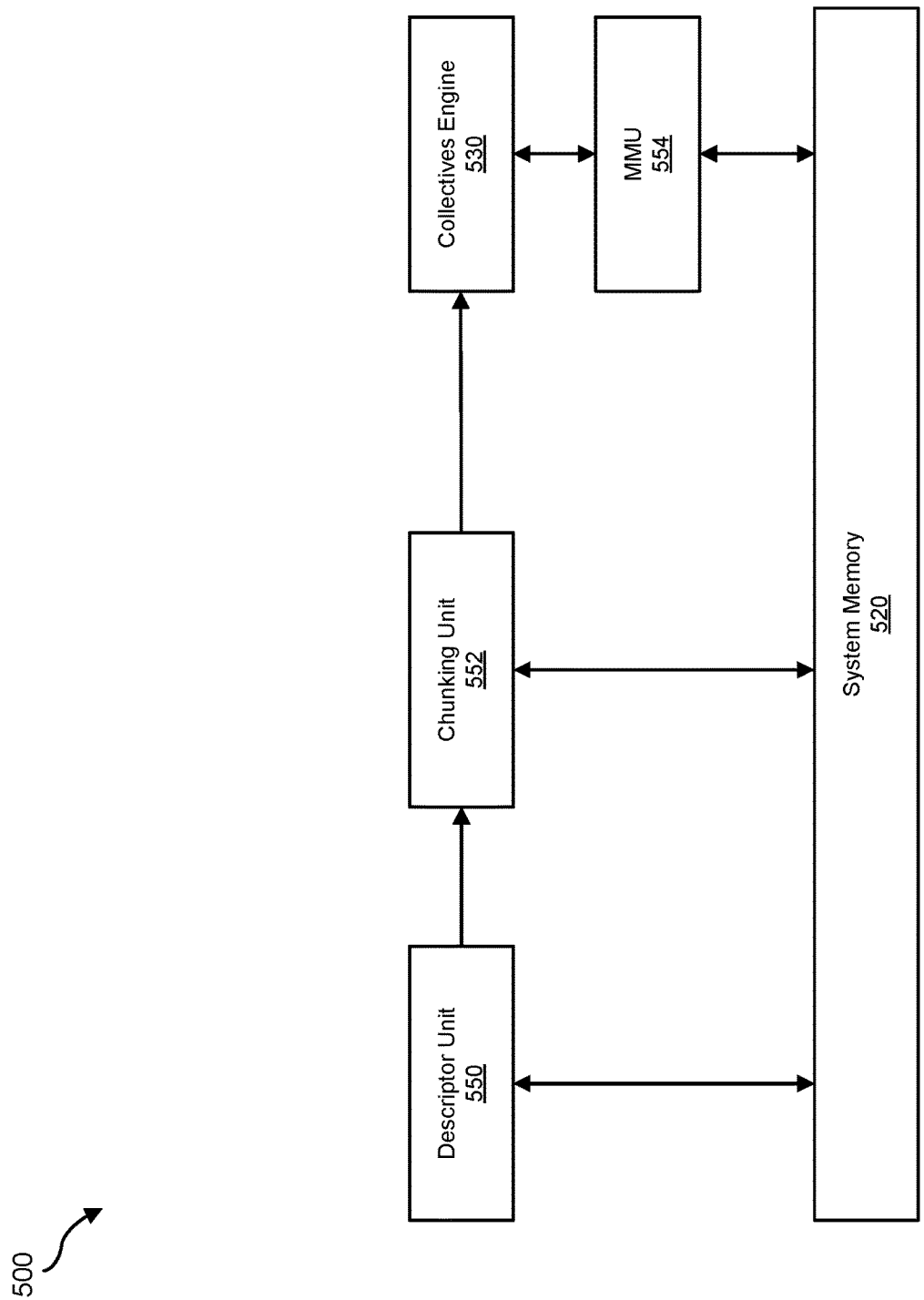
FIG. 5 is a diagram of an exemplary hardware architecture of a multi-address space collectives engine.

FIG. 5 illustrates an example architecture of a system 500 (corresponding to network environment 100 and/or a portion thereof) of a multi-address space collectives engine 530 (corresponding to control circuit 112). FIG. 5 illustrates a hardware flow using inline address translation. A descriptor unit 550 can fetch/parse a descriptor (e.g., as part of a collective operation) that references a virtual/logical address for a system memory 520 (which can correspond collectively to local memories of nodes managed by collectives engine 530). A chunking unit 552 can chunk the data corresponding to the referenced address. In some examples, descriptor unit 550, chunking unit 552, and collectives engine 530 can be co-located on a same device. Unlike in FIG. 4, chunking unit 552 can send the command (having an address yet to be translated) to collectives engine 530. The command can include a virtual address and an address space identifier corresponding to a local memory of a node. Collectives engine 530 can use an MMU 554 for translating, in-line with accessing memory 520, the virtual address and address space identifier into a physical address. In some examples, MMU 554 can correspond to a relevant portion of system memory 520 being accessed, such that multiple MMUs 554 can manage respective portions of system memory 520. Moreover, in some examples MMU 554 can be remote from collectives engine 530.

Figure 6:
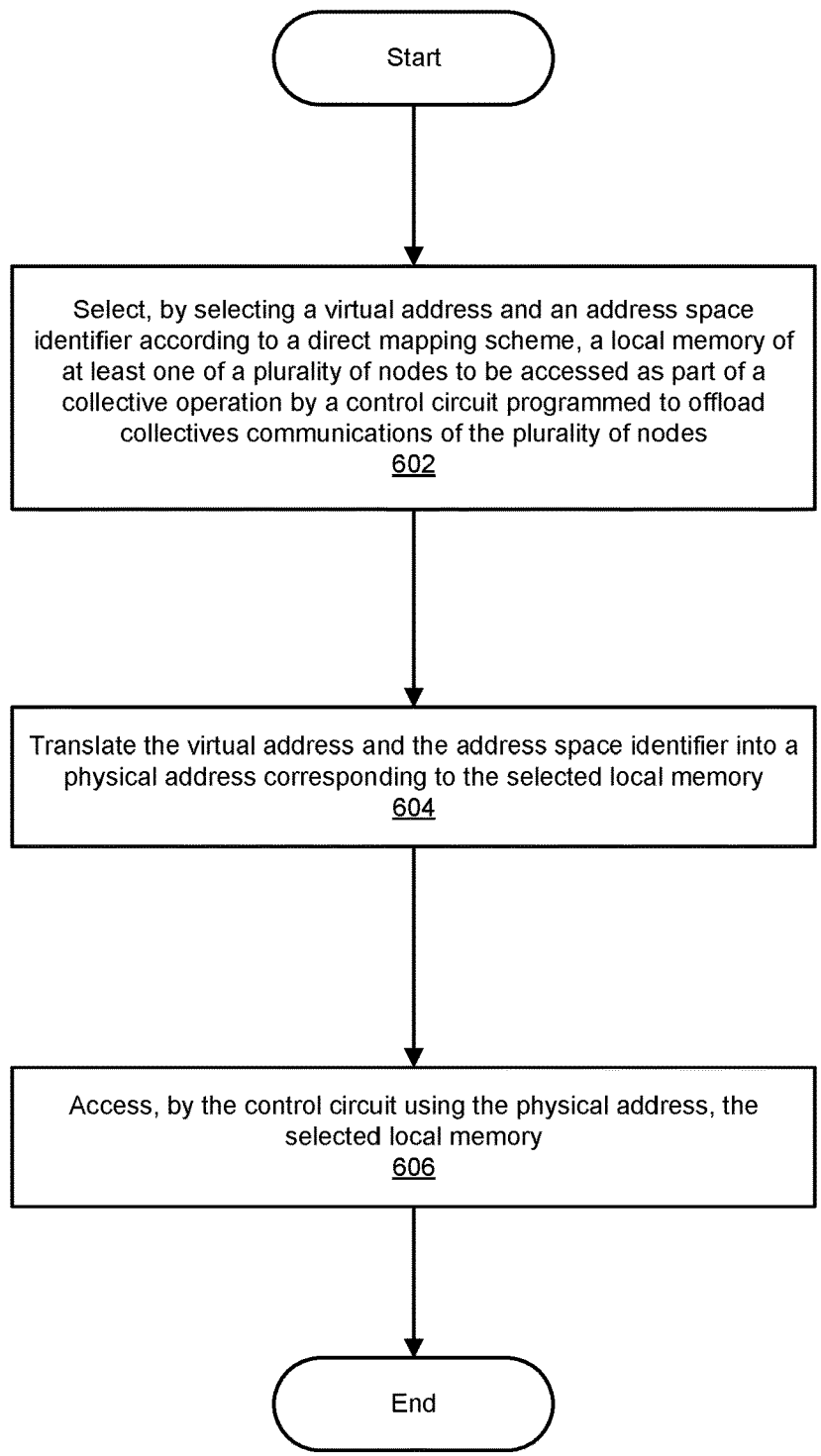
FIG. 6 is a flow diagram of an exemplary method for managing multiple address spaces for a collectives engine.

FIG. 6 is a flow diagram of an exemplary method 600 for accessing multiple address spaces with a collectives engine. The steps shown in FIG. 6 can be performed by any suitable circuit, computer-executable code and/or computing system, including the system(s) illustrated in FIGS. 3, 4, and/or 5. In one example, each of the steps shown in FIG. 6 represent an algorithm whose structure includes and/or is represented by multiple sub-steps, examples of which will be provided in greater detail below.

As illustrated in FIG. 6, at step 602 one or more of the systems described herein select, by selecting a virtual address and an address space identifier according to a direct mapping scheme, a local memory of at least one of a plurality of nodes to be accessed as part of a collective operation by a control circuit programmed to offload collectives communications of the plurality of nodes. For example, collectives engine 330 (e.g., control circuit 112) can select a buffer within node 302A for accessing as part of a collective operation by referencing a virtual address (e.g., node memory 342A) and an address space identifier corresponding to node 302A.

At step 604 one or more of the systems described herein translate the virtual address and the address space identifier into a physical address corresponding to the selected local memory. For example, collectives engine 330 (and/or an MMU) can translate the virtual address and the address space identifier corresponding to the buffer within local memory 320A into a physical address within node memory 342A.

The systems described herein can perform step 604 in a variety of ways. In one example, the control circuit (e.g., a collectives engine) receives the virtual address and the address space identifier and translating the virtual address and the address space identifier into the physical address includes translating, by a memory management unit (MMU), the virtual address and the address space identifier into the physical address (see, e.g., FIG. 5). In some examples, the control circuit receives the physical address that is pre-translated (see, e.g., FIG. 4).

At step 606 one or more of the systems described herein access, by the control circuit using the physical address, the selected local memory. For example, collectives engine 330 can access local memory 320A using the physical address.

As detailed above, the systems and methods described herein relate to address spaces for collective operations. In order for a collectives offload engine (COE) to perform collective operations, the COE needs to access data from each node (e.g., application, GPU partition, network device, etc.). Because each node operates on its own address space, providing data to the COE can incur significant overhead. For example, in a simple approach, each node copies its data into a separate common shared address space accessible by the COE, or the COE maintains an intermediary virtual mapping for remapping the local address spaces for each node. Thus, each node must manage copies of data, or the COE must manage the intermediary virtual mapping, which requires updating changes to the virtual mapping.

The systems and methods described herein can avoid this overhead by using a mapping scheme that allows the COE to directly access the local memories of the nodes without an intermediary virtual mapping. A descriptor can include multiple source/destination addresses, each associated with an address space identifier that corresponds to a node. The COE can use the address space identifier to access the appropriate node, and the addresses themselves for accessing the data.

As detailed above, the systems and methods provided herein allow a collectives engine to support multiple address spaces to reduce overhead associated with managing individual address spaces of nodes/processes for collectives communications. Thus, the systems and methods provided herein provide improved collectives offloading.

As detailed above, the computing devices and systems described and/or illustrated herein broadly represent any type or form of computing device or system capable of executing computer-readable instructions, such as those contained within the modules described herein. In their most basic configuration, these computing device(s) each include at least one memory device and at least one physical processor.

In some examples, the term "memory device" generally refers to any type or form of volatile or non-volatile storage device or medium capable of storing data and/or computer-readable instructions. In one example, a memory device stores, loads, and/or maintains one or more of the modules and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modifies one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SoCs), digital signal processors (DSPs), Neural Network Engines (NNEs), accelerators, graphics processing units (GPUs), portions of one or more of the same, variations or combinations of one or more of the same, or any other suitable physical processor.

Although illustrated as separate elements, the modules described and/or illustrated herein can represent portions of a single module or application. In addition, in certain implementations one or more of these modules can represent one or more software applications or programs that, when executed by a computing device, cause the computing device to perform one or more tasks. For example, one or more of the modules described and/or illustrated herein represent modules stored and configured to run on one or more of the computing devices or systems described and/or illustrated herein. In some implementations, a module can be implemented as a circuit or circuitry. One or more of these modules can also represent all or portions of one or more special-purpose computers configured to perform one or more tasks.

In addition, one or more of the modules described herein transforms data, physical devices, and/or representations of physical devices from one form to another. For example, one or more of the modules recited herein receives data to be transformed, transforms the data, outputs a result of the transformation to propagate data, uses the result of the transformation to perform a collective operation, and stores the result of the transformation to complete the collective operation and/or a stage thereof. Additionally, or alternatively, one or more of the modules recited herein can transform a processor, volatile memory, non-volatile memory, and/or any other portion of a physical computing device from one form to another by executing on the computing device, storing data on the computing device, and/or otherwise interacting with the computing device.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:
a control circuit configured to offload collectives communications of a plurality of nodes, and configured to manage a direct mapping scheme of local memories of the plurality of nodes for access by the control circuit-,
wherein the control circuit is configured to receive a descriptor as part of a collective operation, and the descriptor includes an address space identifier corresponding to at least one of the local memories of the plurality of nodes.

2. The device of claim 1, wherein the control circuit receives a pre-translated physical address for accessing at least one of the local memories of the plurality of nodes.

3. The device of claim 2, further comprising a memory management unit (MMU) for translating physical addresses of the local memories of the plurality of nodes using the direct mapping scheme.

4. The device of claim 2, wherein the control circuit receives the pre-translated physical address as part of the descriptor for the collective operation.

5. The device of claim 1, wherein the control circuit receives, as part of the descriptor, a virtual address associated with the address space identifier and corresponding to the at least one of the local memories of the plurality of nodes.

6. The device of claim 5, further comprising a memory management unit (MMU) configured to translate, in-line with an access request by the control circuit, the virtual address and the address space identifier into a physical address of the at least one of the local memories of the plurality of nodes.

7. The device of claim 1, wherein at least one of the plurality of nodes corresponds to an application.

8. The device of claim 1, wherein at least one of the plurality of nodes corresponds to a network device.

9. The device of claim 1, wherein the descriptor is encoded as a pointer to a configuration page.

10. The device of claim 1, wherein the descriptor is encoded as a chain of extended descriptors with embedded address information.

11. A system comprising:
a plurality of nodes having local memories; and
a control circuit configured to offload collectives communications of the plurality of nodes, and configured to manage a direct mapping scheme of the local memories of the plurality of nodes for access by the control circuit as part of a collective operation, wherein the collective operation is associated with a descriptor including a virtual address with an address space identifier that corresponds to at least one of the local memories of the plurality of nodes.

12. The system of claim 11, wherein the control circuit receives, as part of the descriptor for the collective operation, a pre-translated physical address for accessing the at least one of the local memories of the plurality of nodes.

13. The system of claim 12, further comprising a memory management unit (MMU) for translating physical addresses of the local memories of the plurality of nodes using the direct mapping scheme.

14. The system of claim 11, wherein the control circuit receives, as part of the descriptor for the collective operation, a virtual address associated with the address space identifier and corresponding to the at least one of the local memories of the plurality of nodes.

15. The system of claim 14, further comprising a memory management unit (MMU) configured to translate, in-line with an access request by the control circuit, the virtual address and the address space identifier into a physical address of the at least one of the local memories of the plurality of nodes.

16. The system of claim 11, wherein at least one of the plurality of nodes corresponds to an application.

17. The system of claim 11, wherein at least one of the plurality of nodes corresponds to a network device.

18. A method comprising:
   selecting, by selecting based on a descriptor of a collective operation that includes a virtual address and an address space identifier according to a direct mapping scheme, a local memory of at least one of a plurality of nodes to be accessed as part of the collective operation by a control circuit configured to offload collectives communications of the plurality of nodes;
   translating the virtual address and the address space identifier into a physical address corresponding to the selected local memory; and
   accessing, by the control circuit using the physical address, the selected local memory.

19. The method of claim 18, further comprising receiving, by the control circuit, the physical address.

20. The method of claim 18, further comprising receiving, by the control circuit, the virtual address and the address space identifier, wherein translating the virtual address and the address space identifier into the physical address further comprises translating, by a memory management unit (MMU), the virtual address and the address space identifier into the physical address.

* * * * *